Figure 1:
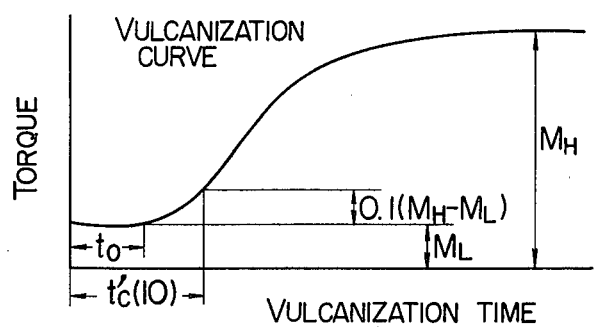

United States Patent [19]

Ikeda et al.

[11] 4,281,085
[45] Jul. 28, 1981

[54] RUBBER COMPOUND CAPABLE OF GIVING A VULCANIZED RUBBER HAVING A HIGH MODULUS OF ELASTICITY

[75] Inventors: Hiroharu Ikeda, Machida; Yasuyuki Shimozato, Yokohama, both of Japan

[73] Assignee: Japan Synthetic Rubber Company, Ltd., Tokyo, Japan

[21] Appl. No.: 37,778

[22] Filed: May 10, 1979

[30] Foreign Application Priority Data

May 12, 1978 [JP] Japan ................... 53/55526
Feb. 14, 1979 [JP] Japan ................... 54/14958

[51] Int. Cl.$^3$ .................... C08F 126/00; C08F 126/06
[52] U.S. Cl. .................... 525/326; 525/343; 525/374; 525/375; 525/379; 525/380; 525/381; 525/382
[58] Field of Search .................... 200/5; 525/179, 167, 525/182, 194, 326, 343, 374, 375, 379, 380, 381, 382

[56] References Cited

U.S. PATENT DOCUMENTS 3,702,877 11/1972 Bonafiglia et al. .................... 525/179
4,094,831 6/1978 Sandstrom .................... 260/5

Primary Examiner—J. Ziegler
Attorney, Agent, or Firm—Oblon, Fisher, Spivak, McClelland & Maier

[57] ABSTRACT

A novel rubber compound which comprises 100 parts by weight of a rubber component (I), 0.1–15 parts by weight of an amine salt of carboxylic acid (II) and 0–7 parts by weight of sulfur (III), said rubber component (I) consisting of 40–100% by weight of an elastomeric copolymer (A) and 60–0% by weight of a vulcanizable rubber (B); said elastomeric copolymer (A) being composed of a $C_4$ or $C_5$ conjugated diene, styrene, and a glycidyl group-containing monomer; the amount of said conjugated diene, the total amount of said conjugated diene and said styrene and the amount of said glycidyl group-containing monomer being 50% by weight or more, 80–99.5% weight and 0.5–20% by weight, respectively, based on the weight of said elastomeric copolymer (A); and the content of said glycidyl group-containing monomer in said rubber component (I) being 0.5% by weight or more, does not undergo scorching at the time of processing and gives, when vulcanized (crosslinked), a vulcanized rubber having a high modulus of elasticity.

15 Claims, 3 Drawing Figures

RUBBER COMPOUND CAPABLE OF GIVING A VULCANIZED RUBBER HAVING A HIGH MODULUS OF ELASTICITY

This invention relates to a novel rubber compound capable of giving a vulcanized rubber having a high modulus of elasticity. More particularly, it relates to a rubber compound which comprises an elastomeric copolymer of a glycidyl group-containing monomer, a conjugated diene and styrene, an amine salt of carboxylic acid as a crosslinking agent, and optionally sulfur.

Recently, a vulcanized rubber having a higher modulus of elasticity than the general purpose vulcanized rubber (a vulcanized rubber having a modulus 1.5–3 times the 100% modulus of the conventional vulcanized rubber) has been desired in special fields. In this case, it is, of course, necessary that the rubber is comparable to the conventional vulcanized rubber in other physical properties of vulcanizate than the modulus and is excellent in processability and workability in the unvulcanized state.

Usually, a vulcanized rubber of high modulus of elasticity has been produced by increasing the amount of carbon black or sulfur to be compounded with a rubber, thereby increasing the crosslinking density. According to these methods, however, the processability and workability of an unvulcanized rubber composition and the physical properties of a vulcanized rubber are unsatisfactory, so that a desirable rubber compound is difficult to obtain.

U.S. Pat. No. 4,094,831 teaches that the green strength of an elastomeric copolymer composed of a $C_4$ or $C_5$ conjugated diene, styrene and a glycidyl group-containing monomer can be improved by incorporating thereinto a crosslinking agent selected from the group consisting of monoamines, diamines, mono-acid anhydrides, poly-acid anhydrides, monocarboxylic acids and polycarboxylic acids. However, this rubber composition still undergoes scorching at the time of kneading and the modulus of elasticity of the vulcanized rubber obtained from said composition is not so high as to satisfy the special requirements.

The present inventors have conducted research or rubber compositions which can give a vulcanized rubber having a high modulus of elasticity but do not undergo scorching at the time of processing. As a result, it has been found that a rubber compound comprising an elastomeric copolymer consisting of a glycidyl group-containing monomer, a conjugated diene and styrene, an amine salt of carboxylic acid as a crosslinking agent, and optionally sulfur has the desired properties.

It is an object of this invention to provide a rubber compound capable of giving a vulcanized rubber having a high modulus of elasticity.

It is another object of this invention to provide a rubber compound which does not undergo scorching at the time of kneading and is excellent in processability.

It is a further object of this invention to provide a vulcanized rubber having a high modulus of elasticity and being excellent in other physical properties.

It is still another object of this invention to provide a rubber compound excellent in processability and capable of giving a vulcanized rubber without undergoing scorch at the time of processing, by compounding a specified crosslinking agent with an elastomeric copolymer consisting of a conjugated diene, styrene and a glycidyl group-containing monomer.

Other objects and advantages of this invention will be apparent from the following description.

According to this invention, there is provided a rubber compound excellent in processability which comprises (I) 100 parts by weight of a rubber component, (II) 0.1–15 parts by weight of an amine salt of carboxylic acid, and (III) 0–7 parts by weight of sulfur, said rubber component (I) consisting of (A) 40–100% by weight of an elastomeric copolymer composed of a $C_4$ or $C_5$ conjugated diene, styrene and a glycidyl group-containing monomer, and (B) 60–0% by weight of a rubber; the total amount of said conjugated diene and said styrene, the content of said glycidyl group-containing monomer and the content of said conjugated diene in said elastomeric copolymer (A) being 80–99.5% by weight, 0.5–20% by weight and at least 50% by weight, respectively; and the content of said glycidyl group-containing monomer in said rubber component (I) being 0.5% by weight or more.

The copolymer (A) used in this invention is composed of a $C_4$ or $C_5$ conjugated diene, styrene and a glycidyl group-containing monomer, wherein the content of said conjugated diene is 50% by weight or more, the total quantity of said conjugated diene and said styrene is 80–99.5% by weight, and the content of said glycidyl group-containing monomer is 0.5–20% by weight. Said $C_4$ or $C_5$ conjugated diene includes butadiene, isoprene, 1,3-pentadiene and mixtures thereof, among which butadiene and isoprene are preferable, and butadiene is particularly preferable. As said glycidyl group-containing monomer, there may be used monomers having a glycidyl group and being copolymerizable with styrene and conjugated diene. Specific examples of said glycidyl group-containing monomer include glycidyl methacrylate, glycidyl acrylate, glycidyl allyl ether and the like, among which glycidyl methacrylate is preferable.

The content of styrene in copolymer (A) is preferably 5% by weight or more and 45% by weight or less from the viewpoint of processability. The content of conjugated diene in copolymer (A) has to be at least 50% by weight, because if its content is less than 50% by weight the copolymer (A) obtained does not have rubber properties suitable for use in this invention. That is, if its content is less than 50%, the vulcanized rubber obtained from the rubber compound of this invention cannot retain a high modulus of elasticity at high temperatures and generates much heat when subjected to repeated deformations. If the content of said glycidyl group-containing monomer in rubber component (I) is less than 0.5% by weight, the vulcanized rubber obtained cannot have a high modulus of elasticity. If the content of said glycidyl group-containing monomer in copolymer (A) is more than 20% by weight, the elongation at break of the vulcanized rubber drops.

Said elastomeric copolymer is usually produced by emulsion polymerization, though it may also be produced by other polymerization processes.

As said crosslinking agent, there are used amine salts of carboxylic acids which can react with the epoxy group of said glycidyl group-containing monomer at a temperature equal to or higher than the vulcanization temperature. As said amine, there may be used primary, secondary and tertiary monoamines and polyamines, among which aliphatic and alicyclic mono- and diamines having 1–20 carbon atoms are preferred. Polyamines having two or more amino groups selected from primary, secondary and tertiary amino groups can also be used. As said monoamine, there may be used primary amines such as ethylamine, butylamine and ethanolamine, secondary amines such as diethylamine, dibutylamine and piperidine and tertiary amines such as tributylamine. As said polyamine, there may be used primary diamines such as hexamethylenediamine, p-phenylenediamine and the like, secondary diamines such as N,N'-dimethylethylenediamine, N,N'-dimethyl-p-phenylene-diamine, piperazine and the like, and teriary diamines such as triethylenediamine and the like. Further, diethylenetriamine, triethylenetetramine, hexamethylenetetramine, polyethyleneimine and the like may also be used. Among these amines, alicyclic amine compounds and aliphatic amine compounds are preferred. Specifically, diamines such as piperazine, hexamethylenediamine and the like and monoamines such as piperidine and the like are preferable, among which piperazine is particularly preferable.

As the carboxylic acid forming a salt with said amine, there may be used aliphatic, alicyclic and aromatic monocarboxylic and dicarboxylic acids having 2–20 carbon atoms such as acetic acid, butyric acid, octanoic acid, stearic acid, cyclohexanoic acid, cyclohexanedicarboxylic acid, benzoic acid, toluic acid, oxalic acid, malonic acid, succinic acid, adipic acid, sebacic acid, and phthalic acid; hydroxyl group-containing aliphatic and aromatic carboxylic acids having 2–20 carbon atoms such as glycolic acid, malic acid, lactic acid, citric acid, and p-oxybenzoic acid; and thiol group-containing aliphatic carboxylic acids having 2–10 carbon atom such as thioglycolic acid. Among these acids, the hydroxyl group-containing carboxylic acids are preferable, and glycolic acid, malic acid, lactic acid and p-oxybenzoic acid are particularly preferable.

The crosslinking agent is added in an amount of 0.1–15 parts by weight and preferably 1–10 parts by weight per 100 parts by weight of rubber component (I). If its amount is less than 0.1 part by weight, a vulcanized rubber having a high modulus of elasticity cannot be obtained. If it is more than 15 parts by weight, the crosslinking agent causes blooming, which is undesirable. By using the specified crosslinking agent, namely a salt formed between the above-mentioned amine and the above-mentioned carboxylic acid, particularly the hydroxyl group-containing or thiol group-containing carboxylic acid, in a specified amount, there can be obtained a rubber compound capable of giving a vulcanized rubber having a high modulus of elasticity and markedly improved in anti-scorch property.

Although the glycidyl group-containing elastomeric copolymer (A) may be used alone in this invention, it may also be used in combination with 60% by weight or less, preferably 50% by weight or less, of another vulcanizable rubber (B). If the amount of vulcanizable rubber (B) exceeds 60% by weight, the characteristic properties of the glycidyl group-containing elastomeric copolymer cannot fully be exhibited, so that a rubber of high modulus is difficult to obtain. Accordingly, it is necessary that the glycidyl group-containing monomer exists in the rubber component (I) in an amount of 0.5% by weight or more.

On the other hand, it is also possible to blend the rubber compound of this invention with a general purpose rubber in order to enhance the modulus of elasticity of vulcanizate without injuring the characteristic properties of rubber. In this case, the compound of this invention is blended in an amount of 10% or more and less than 40%; the content of glycidyl group-containing monomer in the total rubber component being 0.5% by weight or more; and, preferably, the proportions of the amine salt of carboxylic acid and the sulfur to the total rubber component are 0.1 part by weight or more and 0.5 part by weight or more, respectively, per 100 parts by weight of the total rubber component. As said general purpose rubber, the same rubber as the rubber of component (B) may be used. As the vulcanizable rubber (B), there may be exemplified natural rubber, polyisoprene, polybutadiene, styrene-butadiene rubber, ethylene-propylene rubber, butyl rubber, chloroprene rubber, nitrile rubber and the like, among which natural rubber, polyisoprene, polybutadiene and styrene-butadiene rubber are preferred.

In this invention, it is, of course, possible to make crosslinkage with only an amine salt of carboxylic acid. It is particularly preferable, however, to use sulfur in combination therewith from the viewpoint of obtaining a vulcanized rubber having a high modulus of elasticity. In this case, the sulfur is used in an amount of 7 parts or less and preferably 5 parts or less per 100 parts by weight of rubber component (I). When the glycidyl group-containing elastomeric copolymer (A) is blended with vulcanizable rubber (B), the use of sulfur is necessary. In this case, the amount of the sulfur is 0.5–7 parts by weight per 100 parts by weight of rubber component (I).

Conveniently, the addition of the crosslinking agent and sulfur is effected with kneading by means of an open mill or a mixer. The rubber compound of this invention is vulcanized by heating it at a temperature of, for example, 60°–200° C. and preferably 100°–170° C. for 10 minutes to 5 hours. As the mode of heating, either open system or press system may be selected depending on the shape of the object to be heated.

With the rubber compound of this invention may be compounded those reinforcing materials, fillers, processing aids, antioxidants, and other additives which are conventionally compounded with rubbers. However, it is undesirable to add an additive reactive with the glycidyl group in addition to the functional crosslinking agent and said additives throughout the whole production process including the polymerization step. Said additives may be blended by means of a roll or a Banbury mixer, or they may also be added in the course of producing the polymer.

The rubber compound of this invention is excellent in processability and, at the same time, quite excellent in anti-scorch effect, and it can give a vulcanized rubber having a high modulus of elasticity. The vulcanized rubber retains the high modulus of elasticity though only a small drop may occur at high temperatures. The rubber composition of this invention is comparable in processability to commercial blends of emulsion-polymerized SBR, and it is particularly easy to mix with carbon black. The vulcanized rubber usually has a 50% modulus of 25 kg/cm$^2$ or more and a 100% modulus of 50 kg/cm$^2$ or more. Accordingly, the rubber compound of this invention is useful in the fields requiring a high modulus of elasticity such as tire, rubber vibration insulator, bumper, belt, flexible joint, guide roller, ship's side protector, hose, packing material, sealing material and the like.

With reference to Examples and the accompanying drawings, this invention will be illustrated below.

Figure 2:
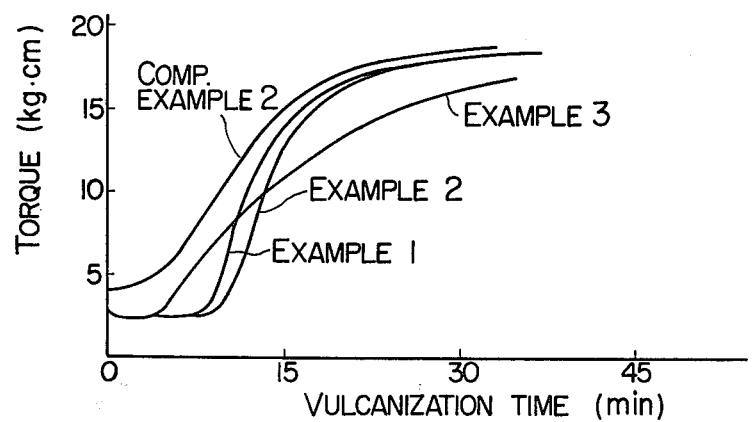
Figure 3:
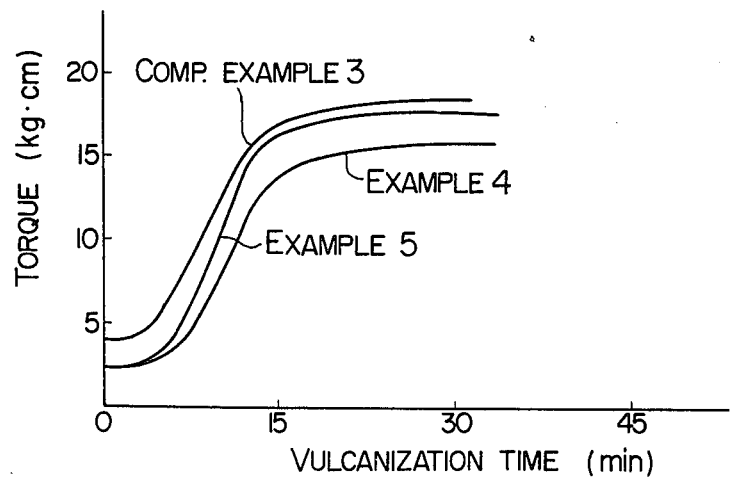

In the accompanying drawings, FIG. 1 shows a graph of vulcanization curve which is presented for the purpose of explaining scorch time ($t'_c(10)$), and;

FIG. 2 and FIG. 3 show graphs of vulcanization curve in the Examples of this invention and the Comparative Examples, which appear hereinafter.

PRODUCTION OF ELASTOMERIC COPOLYMER

The glycidyl methacrylate (abbreviated hereinafter to GMA)-butadiene-styrene copolymer used in the Examples appearing hereinbelow was synthesized in the following manner. In the descriptions given below, parts and % are all by weight unless otherwise specified.

Polymers A and B in Table 1 were produced from 72 parts of butadiene, 26 parts of styrene and 2 parts of GMA, polymers C, E and F in Table 1 from 72 parts of butadiene, 24 parts of styrene and 4 parts of GMA, and polymer D in Table 1 from 72 parts of butadiene, 22 parts of styrene and 6 parts of GMA, by the conventional emulsion polymerization process. The polymerization temperature was 5° C. and the conversion was about 60% in all the cases. The results of polymerization are shown in Table 1.

TABLE 1

| Kind of polymer | $[n]^1$ (dl/g) | $ML_{1+4}^{100°\ C.}$ | Content of GMA$^2$ (%) |
|---|---|---|---|
| A | 1.83 | 44.5 | 3.3 |
| B | 2.14 | 69 | 3.3 |
| C | 2.15 | 57 | 6.7 |
| D | 2.18 | 79 | 9.6 |
| E | 2.25 | 68 | 6.7 |
| F | 2.05 | 47.5 | 6.7 |

$^1$Measured in toluene at 30° C.
$^2$Measured by infrared absorption spectroscopy.

The polymers synthesized by the procedure mentioned above were blended and kneaded according to the recipe shown in Table 2. Then, on the one hand, polymers were vulcanized and the vulcanizates were subjected to tensile test in accordance with JIS K 6301. On the other hand, their vulcanization curves were measured by means of a curemeter (JSR CURELASTOMETER ®, manufactured by Japan Synthetic Rubber Co., Ltd.) (measurement temperature: 145° C.), whereby the anti-scorch effect was evaluated. That is to say, when the torque at the start of measurement is higher than that of the system free from the crosslinking agent and containing sulfur only, it is judged that crosslinking reaction (namely scorching) has been caused before the start of vulcanization. On the other hand, when the torque at the start of measurment is the same as that of the system free from the crosslinking agent and containing sulfur only, the time taken until the crosslinking reaction begins ($t_o$) is measured, and also the time taken until the torque reaches the value of $[M_L+0.1(M_H-M_L)]$ where $M_L$ is the minimum of torque in the vulcanization curve and $M_H$ is the maximum of torque in the same curve ($t'_c(10)$) is determined from the vulcanization curve. The larger the $t_o$ and $t'_c(10)$ values, the more excellent the anti-scorch effect. On the other hand, when the $t_o$ value is less than 0.5 min and the $t'_c(10)$ value is less than 1.0 min, the start of vulcanization is too early and therefore, the vulcanizing processability is inferior. Thus, such a case is not desirable. Accordingly, in such a case, it is judged that the rubber compound has no anti-scorch effect.

TABLE 2

| | Compounding Recipe (parts by weight) | |
|---|---|---|
| Component | Recipe [I] | Recipe [II] |
| Polymer | 100 | 100 |
| Carbon black | 50 | 50 |
| Aromatic oil | 10 | 10 |
| Zinc oxide | 5 | 5 |
| Stearic acid | 3 | 3 |
| Accelerator (N-oxydiethylene-2-benzothiazole sulfenamide) | 1.5 | — |
| Sulfur | 2.5 | — |
| Crosslinking agent | Varying | Varying |

The vulcanization conditions were 60 min at 145° C., provided that in Examples 16–19 and Comparative Example 6, press vulcanization was carried out for 45 min at 145° C.

EXAMPLES 1 AND 2 AND COMPARATIVE EXAMPLES 1 AND 2

Piperazine malate was used as the crosslinking agent in Example 1, and piperazine citrate was used as the crosslinking agent in Example 2. The results obtained are shown in Table 3. For comparison, the results obtained where no crosslinking agent was used (Comparative Example 1) and piperazine was used as the crosslinking agent (Comparative Example 2) are also shown in Table 3. All the crosslinking agents were used in the same molar amount.

TABLE 3

| Example No. | Kind of polymer | Crosslinking agent Kind | Amount (PHR)$^1$ | Recipe | $M_{100}^2$ (kg/cm$^2$) | $T_B^3$ (kg/cm$^2$) | $E_B^4$ (%) | $t_o$ (min) | $t_c'(10)$ (min) |
|---|---|---|---|---|---|---|---|---|---|
| 1 | A | Pierazine malate | 2.56 | [I] | 56 | 212 | 268 | 3.3 | 6.8 |
| 2 | A | Piperazine citrate | 2.49 | [I] | 54 | 163 | 195 | 3.3 | 6.8 |
| Comparative Example 1 | A | — | | [I] | 32 | 216 | 373 | 6.3 | 16.0 |
| Comparative Example 2 | A | Piperazine | 1 | [I] | 52 | 228 | 343 | — | — |

Note:
$^1$PHR means parts per 100 parts by weight of rubber.
$^2$M$_{100}$ means 100% modulus.
$^3$T$_B$ means tensile strength at break.
$^4$E$_B$ means elongation at break.

The vulcanization curves obtained in Examples 1 and 2 and Comparative Example 2 are shown in FIG. 2.

It can be seen that the intended rubbers having a high modulus are obtained in Examples 1 and 2 and the rubbers thus obtained are excellent in anti-scorch effect. On the other hand, Comparative Example 1 shows vulcanization with sulfur only, and the modulus of the vulcanizate obtained is low. In Comparative Example 2, it is seen from FIG. 2 that scorching takes place before vulcanization, because the torque at the vulcanization time of zero is higher than in the other cases as observed on the vulcanization curve.

EXAMPLE 3

Piperazine p-oxybenzoate was used alone as the crosslinking agent. The results obtained are shown in Table 4.

EXAMPLES 6 AND 7

Piperazine salts of monocarboxylic acids were used as the crosslinking agent in Recipe [I] in which polymer E was used. The results obtained are shown in Table 6. It is seen that Examples 6 and 7 gave the intended high modulus rubber excellent in anti-scorch effect.

TABLE 6

| Example No. | Crosslinking agent | | Properties of vulcanizate | | | | Measurement by curemeter | |
|---|---|---|---|---|---|---|---|---|
| | Kind | Amount (PHR) | $M_{50}$ (kg/cm$^2$) | $M_{100}$ (kg/cm$^2$) | $T_B$ (kg/cm$^2$) | $E_B$ (%) | $t_o$ (min) | $t_c'(10)$ (min) |
| 6 | Piperazine octanoate | 4.35 | 39 | 84 | 228 | 219 | 1.0 | 6.0 |
| 7 | Piperazine benzoate | 3.84 | 31 | 66 | 194 | 246 | 1.0 | 8.4 |

The vulcanization curve obtained is shown in FIG. 2.

EXAMPLES 8–11 AND EXAMPLES 4–6

TABLE 4

| Example No. | Kind of polymer | Crosslinking agent | | | $M_{100}$ (kg/cm$^2$) | $T_B$ (kg/cm$^2$) | $E_B$ (%) | $t_o$ (min) | $t_c'(10)$ (min) |
|---|---|---|---|---|---|---|---|---|---|
| | | Kind | Amount (PHR) | Recipe | | | | | |
| 3 | C | Piperazine p-oxybenzoate | 8.42 | [II] | 77 | 178 | 224 | 1.3 | 3.1 |

EXAMPLES 4 AND 5 AND COMPARATIVE EXAMPLE 3

Piperazine glycolate was used as the crosslinking agent and the amount thereof was varied. The amount of the crosslinking agent used in Example 5 was equimolar to that in Comparative Example 3, while that in Example 4 was one half thereof. The results obtained are shown in Table 5.

Piperazine salts of hydroxyl-containing monocarboxylic acid were used as the crosslinking agent in Recipe [I] in which polymer E was used, and the results obtained are shown in Table 7. It is seen that the intended high modulus rubber was obtained and the rubber obtained was excellent in anti-scorch effect. On the other hand, in Comparative Example 4, the rubber was vulcanized with sulfur alone, and the vulcanizate did not have a high modulus. In Comparative Example 5, the

TABLE 5

| Example No. | Kind of polymer | Crosslinking agent | | | $M_{100}$ (kg/cm$^2$) | $T_B$ (kg/cm$^2$) | $E_B$ (%) | $t_o$ (min) | $t_c'(10)$ (min) |
|---|---|---|---|---|---|---|---|---|---|
| | | Kind | Amount (PHR) | Recipe | | | | | |
| 4 | B | Piperazine glycolate | 2.27 | [I] | 56 | 169 | 221 | 1.8 | 5.3 |
| 5 | B | Piperazine glycolate | 5.53 | [I] | 83 | 171 | 173 | 2.0 | 3.5 |
| Comparative Example 3 | B | Piperazine | 2 | [I] | 76 | 174 | 160 | — | — |

The vulcanization curves obtained in Examples 4 and 5 and Comparative Example 3 are shown in FIG. 3. In Comparative Example 3, the torque at the start was great and scorching was observed.

compound Mooney viscosity was too high, and the processability was deteriorated. Measurement of vulcanization curve reveals that the torque at the start of measurement is higher than that of the system vulcanized with sulfur alone (Comparative Example 4). Comparative Example 6 demonstrates that the intended high modulus rubber cannot be obtained by compounding a hydroxyl-containing monocarboxylic acid itself only.

TABLE 7

| Example No. | Crosslinking agent | | Compound mooney viscosity $ML_{1+4}^{100°C}$ | Green strength $T_{max}$ (kg/cm$^2$) | Properties of vulcanizate | | | | Measurement by curemeter | |
|---|---|---|---|---|---|---|---|---|---|---|
| | Kind | Amount (PHR) | | | $M_{50}$ (kg/cm$^2$) | $M_{100}$ (kg/cm$^2$) | $T_B$ (kg/cm$^2$) | $E_B$ (%) | $t_o$ (min) | $t_c'(10)$ (min) |
| Comparative Example 4 | — (S only) | — | 59.5 | 4.0 | 19 | 37 | 203 | 351 | 7.3 | 21.1 |
| Comparative Example 5 | Piperazine | 1 | 142.0 | 26.1 | 57 | 122 | 204 | 169 | Scorch | |
| Comparative Example 6 | Glycolic acid | 1.77 | 63.0 | 4.2 | 20 | 40 | 173 | 231 | 11.4 | 29.2 |
| Example 8 | Piperazine glycolate | 2.77 | 68.0 | 5.1 | 35 | 77 | 194 | 218 | 1.5 | 6.7 |
| Example 9 | Piperazine p-oxybenzoate | 4.21 | 65.0 | 5.5 | 36 | 83 | 168 | 187 | 1.9 | 6.9 |

TABLE 7-continued

| Example No. | Crosslinking agent | | Compound mooney viscosity ML$\mid^{100°C.}_{+4}$ | Green strength T$_{max}$ (kg/cm²) | Properties of vulcanizate | | | | Measurement by curemeter | |
|---|---|---|---|---|---|---|---|---|---|---|
| | Kind | Amount (PHR) | | | M$_{50}$ (kg/cm²) | M$_{100}$ (kg/cm²) | T$_B$ (kg/cm²) | E$_B$ (%) | t$_o$ (min) | t$_c'$(10) (min) |
| Example 10 | Piperazine oxalate | 2.05 | 62.0 | 4.5 | 25 | 51 | 152 | 231 | 2.5 | 15.8 |
| Example 11 | Piperazine malonate | 2.21 | 64.0 | 4.8 | 33 | 72 | 197 | 226 | 0.8 | 6.3 |

EXAMPLES 12-15 AND COMPARATIVE EXAMPLES 7 AND 8

The hexamethylenediamine salts of carboxylic acids were used as the crosslinking agent in Recipe [I] in which polymer F was used. The results obtained are shown in Table 8. It is seen that both the glycolate and the nylon salts give the intended high modulus rubbers excellent in anti-scorch effect. On the other hand, the rubber obtained in Comparative Example 7 has a high compound Mooney viscosity and a low processability. Measurement of vulcanization curve reveals that the torque at the start of measurement is higher than that in the system vulcanized with sulfur alone. Comparative Example 8 demonstrates that the intended high modulus rubber cannot be obtained by compounding the carboxylic acid alone.

EXAMPLE 16

Piperidine glycolate (monoamine salt of carboxylic acid) was used as the crosslinking agent. The results obtained are shown in Table 9.

TABLE 9

| Example No. | Kind of polymer | Crosslinking agent | | Recipe | M$_{100}$ (kg/cm²) | T$_B$ (kg/cm²) | E$_B$ (%) | t$_o$ (min) | t$_c'$(10) (min) |
|---|---|---|---|---|---|---|---|---|---|
| | | Kind | Amount (PHR) | | | | | | |
| 16 | C | Piperidine glycolate | 4.0 | [I] | 51 | 194 | 286 | 1.5 | 4.1 |
| 17 | E | 2-Butylamine benzoate | 4.53 | [I] | 50 | 203 | 282 | 1.5 | 6.3 |

It is seen from Table 9 that the monoamine salt of a carboxylic acid similarly produces the intended high modulus rubber excellent in anti-scorch effect.

EXAMPLES 18-21 AND COMPARATIVE EXAMPLE 9

The GMA-containing SBR of this invention was blended with other rubbers. The recipes used are shown in Table 10 and the results obtained are shown in Table 11.

TABLE 8

| Example No. | Crosslinking agent | | Compound Mooney viscosity ML$\mid^{100°C.}_{+4}$ | Green strength T$_{max}$ (kg/cm²) | Properties of vulcanizate | | | | Measurement by curemeter | |
|---|---|---|---|---|---|---|---|---|---|---|
| | Kind | Amount (PHR) | | | M$_{50}$ (kg/cm²) | M$_{100}$ (kg/cm²) | T$_B$ (kg/cm²) | E$_B$ (%) | t$_o$ (min) | t$_c'$(10) (min) |
| Comparative Example 7 | Hexamethylenediamine | 1.35 | 154.0 | 36.2 | 46 | 97 | 217 | 238 | Scorch | |
| Comparative Example 8 | Adipic acid | 1.70 | 67.5 | 4.5 | 19 | 35 | 127 | 281 | 5.0 | 21.6 |
| Example 12 | 6,6-nylon salt[1] | 3.05 | 65.0 | 4.8 | 25 | 52 | 112 | 178 | 1.9 | 5.5 |
| Example 13 | 6,10-nylon salt[2] | 3.70 | — | 5.1 | 31 | 61 | 180 | 254 | 2.0 | 4.4 |
| Example 14 | 6,4-nylon salt[3] | 2.72 | — | 5.0 | 30 | 63 | 178 | 234 | 2.8 | 5.5 |
| Example 15 | Hexamethylenediamine glycolate | 4.62 | — | — | 30 | 64 | 204 | 259 | 1.8 | 4.0 |

[1]Hexamethylenediamine adipate
[2]Hexamethylenediamine sebacate
[3]Hexamethylenediamine succinate

TABLE 10

| | Recipes | | | | |
|---|---|---|---|---|---|
| | Example 18 | Example 19 | Example 20 | Example 21 | Comparative Example 9 |
| NR | 0 | 25 | 50 | 75 | 100 |
| Polymer D | 100 | 75 | 50 | 25 | 0 |
| Carbon black | 50 | 50 | 50 | 50 | 50 |
| Aromatic oil | 10 | 10 | 10 | 10 | 10 |
| Zinc oxide | 5 | 5 | 5 | 5 | 5 |
| Stearic acid | 3 | 3 | 3 | 3 | 3 |
| Dibenzothiazolyl disulfide | 1.5 | 1.3 | 1.1 | 0.9 | 0.7 |
| Tetramethylthiuram disulfide | 0.2 | 0.15 | 0.1 | 0.05 | 0 |
| Sulfur | 2.5 | 2.5 | 2.5 | 2.5 | 2.5 |
| Piperazine glycolate | 2.77 | 2.07 | 1.39 | 0.69 | 0 |

TABLE 11

| Example No. | $M_{100}$ (kg/cm$^2$) | $T_B$ (kg/cm$^2$) | $E_B$ (%) | $t_0$ (min) | $t_c'(10)$ (min) |
| --- | --- | --- | --- | --- | --- |
| 18 | 96 | 174 | 159 | 1.0 | 3.0 |
| 19 | 79 | 151 | 167 | 1.3 | 2.8 |
| 20 | 57 | 148 | 211 | 1.5 | 2.9 |
| 21 | 38 | 156 | 299 | 1.8 | 2.8 |
| Comparative Example 9 | 19 | 145 | 411 | 2.0 | 2.8 |

What is claimed is:

1. A rubber compound, which comprises:
 (1) 100 parts by weight of a rubber component,
 (2) 0.1–15 parts by weight of an amine salt of a carboxylic acid, and
 (3) 0–7 parts by weight of sulfur, said rubber component (1) comprising an elastomeric copolymer being composed of a $C_4$ or $C_5$ conjugated diene, styrene and a glycidyl group-containing monomer; the content of said conjugated diene, the total amount of said conjugated diene and said styrene and the content of said glycidyl group-containing monomer in said elastomeric copolymer being 50% by weight or more, 80–99.5% by weight and 0.5–20% by weight, respectively.

2. The rubber compound according to claim 1, wherein said amine salt of a carboxylic acid is a salt formed between a carboxylic acid selected from the group consisting of $C_2$–$C_{20}$ aliphatic monocarboxylic or dicarboxylic acids; alicyclic monocarboxylic or dicarboxylic acids having 20 carbon atoms or less; aromatic monocarboxylic or dicarboxylic acids having 20 carbon atoms or less and $C_2$–$C_{20}$ carboxylic acids having hydroxyl groups or thiol groups, and an amine selected from the group consisting of $C_1$–$C_{20}$ aliphatic or alicyclic monoamines and polyamines.

3. The rubber compound according to claim 1, wherein said amine salt of carboxylic acid is an amine salt of a carboxylic acid having hydroxyl group or thiol group.

4. The rubber compound according to claim 1 or 2, wherein said amine is a monoamine or a diamine.

5. The rubber compound according to claim 1 or 2, wherein said amine salt of a carboxylic acid is a piperazine salt.

6. The rubber compound according to claim 1 or 2, wherein said amine salt of carboxylic acid is a piperidine salt.

7. The rubber compound according to claim 1 or 2, wherein said carboxylic acid is selected from the group consisting of acetic acid, butyric acid, octanoic acid, stearic acid, benzoic acid, toluic acid, oxalic acid, malonic acid, succinic acid, adipic acid, sebacic acid, phthalic acid, glycolic acid, malic acid, lactic acid, citric acid, p-oxybenzoic acid, and thioglycolic acid.

8. The rubber compound according to claim 1 or 2, wherein said carboxylic acid is selected from the group consisting of glycolic acid, malic acid, lactic acid and p-oxybenzoic acid.

9. The rubber compound according to claim 1 or 2, wherein said amine is selected from the group consisting of ethylamine, butylamine, ethanolamine, diethylamine, dibutylamine, piperidine, ethyleneimine, tributylamine, hexamethylenediamine, p-phenylenediamine, N,N'-dimethylethylenediamine, N,N'-dimethyl-p-phenylenediamine, piperazine, triethylenediamine, diethylenetriamine, triethylenetetramine, hexamethylenetetramine and polyethyleneimine.

10. The rubber compound according to claim 1 or 2, wherein said amine is selected from the group consisting of piperazine, hexamethylenediamine and piperidine.

11. The rubber compound according to claim 5, wherein said carboxylic acid is glycolic acid, malic acid, lactic acid or p-oxybenzoic acid.

12. The rubber compound according to claim 6, wherein said carboxylic acid is glycolic acid, malic acid, lactic acid, or p-oxybenzoic acid.

13. The rubber compound according to claim 1, wherein the content of sulfur is 0.5–7 parts by weight based on 100 parts by weight of the rubber component (I).

14. The rubber compound according to claim 1, 2 or 3, wherein the amount of said amine salt of said carboxylic acid added is 1–10 parts by weight per 100 parts by weight of rubber component (I).

15. The rubber compound according to claim 1, wherein said amine salt of a carboxylic acid is the hexamethylenediamine salt of adipic acid, sebacic acid or succinic acid.

* * * * *